(12) United States Patent
Saily et al.

(10) Patent No.: US 10,694,400 B2
(45) Date of Patent: Jun. 23, 2020

(54) USE OF PACKET STATUS REPORT FROM SECONDARY BASE STATION TO MASTER BASE STATION IN WIRELESS NETWORK

(71) Applicant: NOKIA SOLUTIONS AND NETWORKS OY, Espoo (FI)

(72) Inventors: Mikko Saily, Laukkoski (FI); Henri Markus Koskinen, Espoo (FI); Claudio Rosa, Randers (DK)

(73) Assignee: Nokia Solutions and Networks Oy, Espoo (FI)

(*) Notice: Subject to any disclaimer, the term of this patent is extended or adjusted under 35 U.S.C. 154(b) by 14 days.

(21) Appl. No.: 14/910,572

(22) PCT Filed: Aug. 9, 2013

(86) PCT No.: PCT/EP2013/066676
§ 371 (c)(1),
(2) Date: Feb. 5, 2016

(87) PCT Pub. No.: WO2015/018451
PCT Pub. Date: Feb. 12, 2015

(65) Prior Publication Data
US 2016/0183103 A1    Jun. 23, 2016

(51) Int. Cl.
*H04W 24/02* (2009.01)
*H04W 36/02* (2009.01)
(Continued)

(52) U.S. Cl.
CPC .......... *H04W 24/02* (2013.01); *H04L 1/1877* (2013.01); *H04W 24/04* (2013.01);
(Continued)

(58) Field of Classification Search
CPC ........ H04W 36/0005; H04W 36/0033; H04W 36/04; H04W 36/08; H04W 36/22; H04W 36/24
See application file for complete search history.

(56) References Cited

U.S. PATENT DOCUMENTS

| | | | |
|---|---|---|---|
| 8,411,652 B2 | 4/2013 | Hans et al. | |
| 2008/0268852 A1* | 10/2008 | Petrovic | H04W 36/10 455/442 |

(Continued)

FOREIGN PATENT DOCUMENTS

| | | |
|---|---|---|
| EP | 2205021 A1 | 7/2010 |
| WO | 2011/100492 A1 | 8/2011 |

(Continued)

OTHER PUBLICATIONS

3GPP TR 36.842 V0.2.0 (May 2013); 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), May 2013.

(Continued)

*Primary Examiner* — Scott M Sciacca
(74) *Attorney, Agent, or Firm* — Brake Hughes Bellermann LLP

(57) ABSTRACT

Various example embodiments are disclosed herein. A technique is provided for detecting, by a secondary base station (BS), a trigger condition in a wireless network, the wireless network including a mobile station (MS) that is connected to both a master base station (master BS) and a secondary base station (secondary BS), and sending a protocol data unit (PDU) status report from the secondary BS to the master BS in response to the secondary BS detecting the trigger con- (Continued)

dition, the PDU status report identifying one or more PDUs or portions thereof for further transmission to the MS.

27 Claims, 5 Drawing Sheets

(51) Int. Cl.
*H04W 36/24* (2009.01)
*H04L 1/18* (2006.01)
*H04W 36/00* (2009.01)
*H04W 24/04* (2009.01)
*H04W 40/02* (2009.01)
*H04L 1/16* (2006.01)
*H04W 76/15* (2018.01)

(52) U.S. Cl.
CPC ... *H04W 36/0055* (2013.01); *H04W 36/0069* (2018.08); *H04W 36/02* (2013.01); *H04W 40/02* (2013.01); *H04L 1/1671* (2013.01); *H04W 76/15* (2018.02)

(56) References Cited

U.S. PATENT DOCUMENTS

| | | | |
|---|---|---|---|
| 2011/0021154 A1* | 1/2011 | Marinier | H04W 72/02 455/67.11 |
| 2011/0103277 A1* | 5/2011 | Watfa | H04W 36/0022 370/310 |
| 2011/0256870 A1* | 10/2011 | Park | H04W 36/30 455/436 |
| 2013/0010611 A1* | 1/2013 | Wiemann | H04L 1/1867 370/242 |
| 2013/0039269 A1* | 2/2013 | Kubota | H04L 1/1685 370/328 |
| 2013/0170357 A1* | 7/2013 | Anchan | H04L 65/4076 370/237 |
| 2013/0183974 A1* | 7/2013 | Johansson | H04W 76/027 455/436 |
| 2013/0188575 A1 | 7/2013 | Lee et al. | |
| 2014/0204771 A1* | 7/2014 | Gao | H04W 36/28 370/252 |
| 2014/0204910 A1* | 7/2014 | Muller | H04W 36/0083 370/331 |
| 2014/0220974 A1* | 8/2014 | Hsu | H04W 36/0088 455/436 |
| 2015/0244429 A1* | 8/2015 | Zhang | H04B 7/024 370/329 |
| 2015/0264609 A1* | 9/2015 | Zhang | H04W 36/0055 455/436 |
| 2015/0296428 A1* | 10/2015 | Michel | H04W 56/00 455/436 |
| 2016/0135103 A1* | 5/2016 | Lee | H04W 28/08 455/444 |
| 2016/0164793 A1* | 6/2016 | Basu Mallick | H04W 28/06 370/235 |

FOREIGN PATENT DOCUMENTS

| | | |
|---|---|---|
| WO | 2012/064772 A1 | 5/2012 |
| WO | 2013/023842 A1 | 2/2013 |
| WO | 2013023842 A1 | 2/2013 |
| WO | 2013/104413 A1 | 7/2013 |
| WO | WO-2014075210 A1 * | 5/2014 ............ H04B 7/024 |

OTHER PUBLICATIONS

3GPP TR 36.932 V12.1.0 (Mar. 2013); 3rd Generation Partnership Project; Technical Specification Group Radio Access Network; Scenarios and requirements for small cell enhancements for E-UTRA and E-UTRAN (Release 12), Mar. 2013.
3GPP TS 36.323 V11.2.0 (Mar. 2013); 3rd Generation Partnership Project; Technical Specification Group Radio Access Network; Evolved Universal Terrestrial Radio Access (E-UTRA); Packet Data Convergence Protocol (PDCP) specification (Release 11), Mar. 2013.
"Data split options and considerations on U-plane protocol architecture for dual connectivity", Nokia Siemens Networks, Nokia Corporation, R2-131054, 3GPP TSG-RAN WG2 Meeting #81bis, Apr. 15-Apr. 19, 2013, 9 pages.
"Analysis of the RLF in dual connectivity", Pantech, R2-131100, 3GPP TSG-RAN WG2 Meeting #81bis, Apr. 15-Apr. 19, 2013, 5 pages.
International Search Report received for PCT International Application No. PCT/EP2013/066676, dated Jun. 13, 2014, 14 pages.
International Search Report and Written Opinion for International Application No. PCT/EP2013/066676, dated Jun. 13, 2014, 14 pages.
Rao, V. Srinivasa et al., "Protocol Signaling Procedures in LTE", Radisys Corporation, 2011, 11 pages.
ETSI TS 136 321 v11.3.0 Technical Specification, LTE; Evolved Universal Terrestrial Radio Access (E-UTRA); Medium Access Control (MAC) protocol specification (3GPP TS 36.321 version 11.3.0 Release 11), Jul. 2013, 59 pages.
ETSI TS 136 322 v11.0.0 Technical Specification, LTE; Evolved Universal Terrestrial Radio Access (E-UTRA); Radio Link Control (RLC) protocol specification (3GPP TS 36.322 version 11.0.0 Release 11), Oct. 2012, 42 pages.
ETSI TS 136 331 v11.4.0 Technical Specification, LTE; Evolved Universal Terrestrial Radio Access (E-UTRA); Radio Link Control (RLC) protocol specification (3GPP TS 36.322 version 11.0.0 Release 11), Jul. 2013, 350 pages.
First Office Action for Chinese Application No. 2013800801605, dated Jun. 4, 2018, 8 pages.
Second Office Action for Chinese Application No. 201380080160.5, dated Jan. 23, 2019, 5 pages.
Office Action for Chinese Application No. 201380080160.5, dated May 7, 2019, 6 pages.
Office Action for European Application No. 13779748.6, dated Feb. 25, 2019, 3 pages.

* cited by examiner

USE OF PACKET STATUS REPORT FROM SECONDARY BASE STATION TO MASTER BASE STATION IN WIRELESS NETWORK

This application is a national stage entry of PCT Application No. PCT/EP2013/066676, filed Aug. 9, 2013, entitled "USE OF PACKET STATUS REPORT FROM SECONDARY BASE STATION TO MASTER BASE STATION IN WIRELESS NETWORK" which is hereby incorporated by reference in its entirety.

TECHNICAL FIELD

This description relates to wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations, which are referred to as enhanced Node Bs (eNBs), provide wireless access within a coverage area or cell. In LTE, mobile devices, or mobile stations are referred to as a user equipment (UE). LTE has included a number of improvements or developments.

LTE-Advanced is an example of a system capable of providing carrier aggregation where a plurality of component carriers are aggregated into an aggregated carrier that has wider transmission bandwidth. When carrier aggregation is used, there are a number of serving cells, one for each component carrier. A primary component carrier (PCC) is provided by a primary cell (PCell) whereas further carriers (secondary component carriers or SCCs) can each be provided by a corresponding secondary cell (SCell). The radio resource control (RRC) connection is handled only by the PCell, served by the PCC. The SCCs may be added and removed as required, while, at least in some cases, the PCC is changed only at handover.

Inter-site carrier aggregation has also been proposed. For example, smaller cells can be used simultaneously in conjunction with a macro cell. An aim of dual connectivity is to decrease mobility related signaling load towards the core network as well as to benefit from gains by the inter-site carrier aggregation. In some aspects dual connectivity may be considered very similar to carrier aggregation with the macro or master serving cell serving as the primary cell and the small cells as the secondary cells.

SUMMARY

According to an example implementation, a method may include detecting, by a secondary base station (BS), a trigger condition in a wireless network, the wireless network including a mobile station (MS) that is connected to both a master base station (master BS) and a secondary base station (secondary BS), and sending a protocol data unit (PDU) status report from the secondary BS to the master BS in response to the secondary BS detecting the trigger condition, the PDU status report identifying one or more PDUs or portions thereof for further transmission to the MS.

According to another example implementation, an apparatus may include a processor and a memory including computer instructions, when executed by the at least one processor, cause the apparatus to detect, by a secondary base station (BS), a trigger condition in a wireless network, the wireless network including a mobile station (MS) that is connected to both a master base station (master BS) and a secondary base station (secondary BS), and send a protocol data unit (PDU) status report from the secondary BS to the master BS in response to the secondary BS detecting the trigger condition, the PDU status report identifying one or more PDUs or portions thereof for further transmission to the MS.

In another example implementation, a computer program product is provided, the computer program product including a non-transitory computer-readable storage medium and storing executable code that, when executed by at least one data processing apparatus, is configured to cause the at least one data processing apparatus to perform a method including detecting, by a secondary base station (BS), a trigger condition in a wireless network, the wireless network including a mobile station (MS) that is connected to both a master base station (master BS) and a secondary base station (secondary BS), and sending a protocol data unit (PDU) status report from the secondary BS to the master BS in response to the secondary BS detecting the trigger condition, the PDU status report identifying one or more PDUs or portions thereof for further transmission to the MS.

The details of one or more implementations are set forth in the accompanying drawings and the description below. Other features will be apparent from the description and drawings, and from the claims.

DETAILED DESCRIPTION

Figure 1:
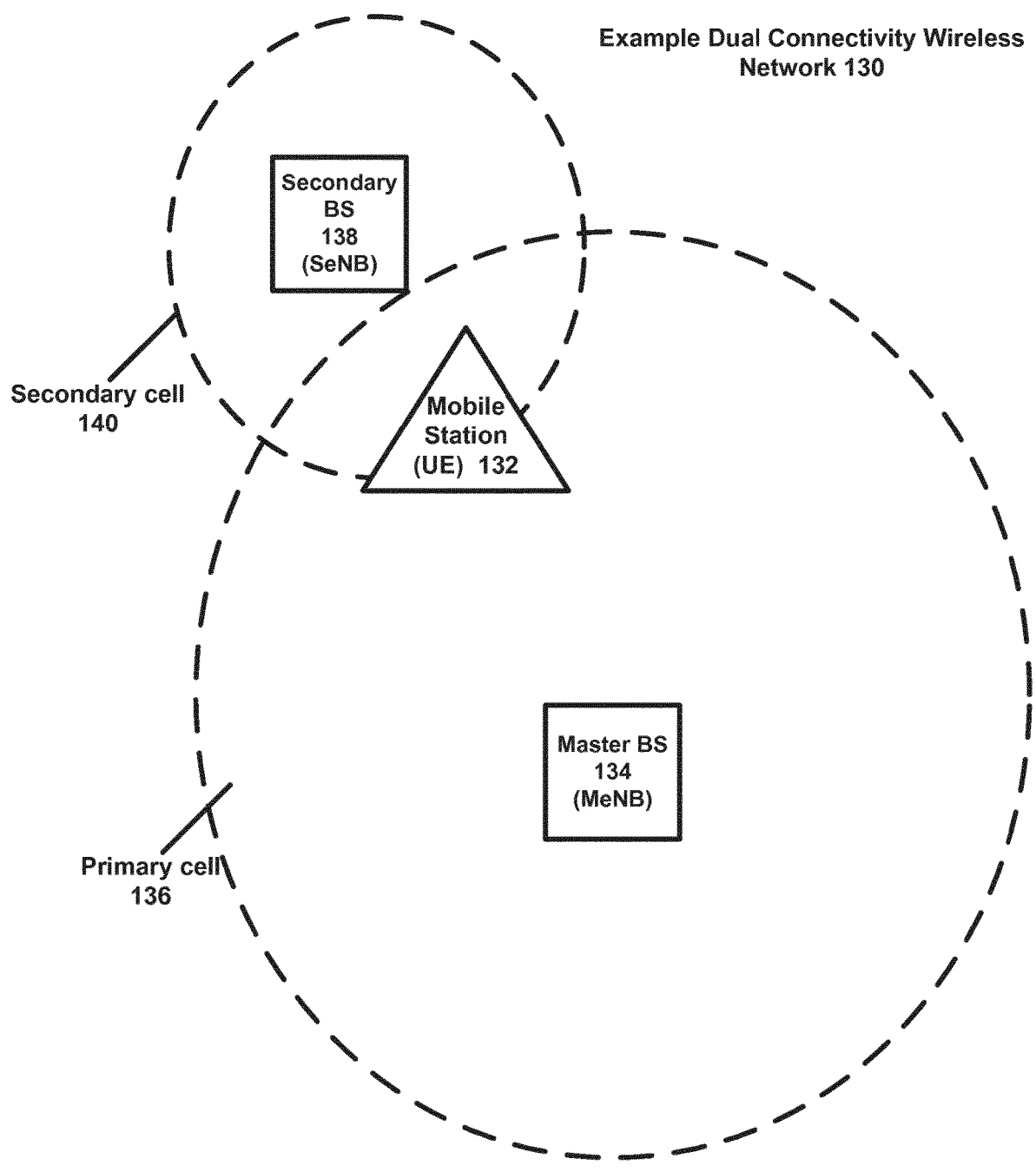
FIG. 1 is a block diagram of a dual connectivity wireless network 130 according to an example implementation.

A technique is provided for allowing a secondary BS, in response to detecting a trigger condition, to notify a master BS in a multicarrier arrangement of packet (or PDU) status information for one or more PDUs or portions thereof that were not successfully transmitted from the secondary BS to a MS.

A method may include detecting, by a secondary base station (BS), a trigger condition in a wireless network, the wireless network including a mobile station (MS) that is connected to both a master base station (master BS) and a secondary base station (secondary BS), and sending a protocol data unit (PDU) status report from the secondary BS to the master BS in response to the secondary BS detecting the trigger condition, the PDU status report identifying one or more PDUs or portions thereof for further transmission to the MS. By sending the PDU status report when the trigger condition occurs, this may allow the master BS to more quickly receive notification of the non-transmitted PDUs and then transmit/retransmit the non-transmitted PDUs/packets to the MS.

The trigger condition may include, for example, a radio link failure of a radio link or radio bearer between MS and secondary BS that is detected by the secondary BS; a PDU status report requested by master BS; a traffic overload condition at the secondary BS; detecting, by the secondary BS, that an amount of traffic over a radio link (or radio bearer) between the MS and the secondary BS is less than a threshold; a message received from the master BS requesting that the secondary BS cease operating on a radio link (or radio bearer) between the secondary BS and the MS; a message received from the master BS requesting that the secondary BS deactivate or deconfigure a radio link (or radio bearer) between the secondary BS and the MS based on the MS moving via handover to a new secondary BS; a message received from another BS, that is not the master BS, requesting that the secondary BS cease operating on a radio link (or radio bearer) between the secondary BS and the MS; a message received from the MS requesting that the secondary BS cease operating on a radio link (or radio bearer) between the secondary BS and the MS; a message received from the master BS indicating that a radio link (or radio bearer) between the secondary BS and the MS has been deactivated or deconfigured; and a message received from another BS, that is not the master BS, indicating that a radio link (or radio bearer) between the secondary BS and the MS has been deactivated or deconfigured based on the MS moving via handover to a new secondary BS. These are merely some example trigger conditions, and others may be used.

According to an example implementation, the secondary BS detecting a trigger condition may include receiving a message. The term message may include any form of message or information, such as a packet, a control element, one or more bits, or even simply a signal that may be transmitted via network resources to the secondary BS that may be interpreted by the secondary BS as a request or an indication as described herein. The message may be received by the secondary BS from either the master BS, another secondary BS (or other BS), or the MS. The message, for example, may be either: 1) a request to cease operating on a radio link between the secondary BS and the MS, in which case, the secondary BS will cease operation on the corresponding or identified radio link; 2) a request to deactivate or deconfigure a radio link between the secondary BS and the MS, in which case, the secondary BS will proceed with deactivation or deconfiguration of the corresponding radio link, and consequently cease operation on that radio link; or 3) an indication that a radio link between the secondary BS and the MS has been deactivated or deconfigured, in which case, the secondary BS will cease operating on the radio link. In one example implementation, the request to deactivate the radio link or the request to deconfigure the radio link may be considered as examples of the request to cease operating on the radio link, although other example requests may be used.

The message requesting that the secondary BS cease operating on the radio link may include, for example: a connection reconfiguration request that requests deconfiguration or release of a secondary cell associated with a secondary component carrier and the radio link between the secondary BS and the MS; or, a request to deactivate a secondary cell (SCell) associated with the secondary component carrier and the radio link between the secondary BS and the MS. These are merely some examples, and other request messages may be used.

In cellular wireless systems, a base station typically provides wireless services within a cell or area. For example, some cells may provide wide coverage areas, while other cells may provide smaller coverage areas. The smaller radio/wireless coverage area(s) or cells associated with one base station can be located wholly or partially within a larger cell or larger radio coverage area of another base station. According to an example implementation, a mobile station (MS) may communicate with more than one base station or with more than one cell, which may be referred to as dual connectivity, where a MS may be connected to multiple base stations. Release 10 of the E-UTRA specifications introduce carrier aggregation (CA), where two or more component carriers (CCs) are aggregated to support wider transmission bandwidths. Although LTE is used as an example wireless network, the various aspects or details described herein may be applicable to any wireless technology or standard.

FIG. 1 is a block diagram of a dual connectivity wireless network 130 according to an example implementation. In the wireless network 130 of FIG. 1, a mobile station (MS) 132, which may also be referred to as a user equipment (UE), may be connected (and in communication) with multiple base stations (BSs), which may also be referred to as enhanced Node Bs (eNBs). The MS 132 may be connected (and in communication) with a master BS 134 (MeNB) which provides wireless coverage within a primary cell 136. Master BS 134 may sometimes be referred to as a macro BS, or macro eNB, or other name. The MS 132 may also be simultaneously connected to and/or in communication with a secondary BS 138 (SeNB), which provides wireless coverage within a secondary cell 140.

Therefore, according to one example implementation, a dual connectivity wireless network allows for a MS (such as MS 132) to be simultaneously connected to multiple base stations, e.g., simultaneously connected to both a master BS (or MeNB) 134, and a secondary BS (SeNB) 138. A dual connectivity wireless network, such as the network 130 shown in FIG. 1 may have several advantages, such as, for example, decreasing a signaling load towards the core network, sharing traffic/packet processing among multiple base stations, as well as benefiting from flexible resource usage where one or more carriers may be used on a radio link between the MS and each BS, e.g., inter-site carrier aggregation. While there are advantages to a MS being connected simultaneously to two or more BSs, this dual connectivity arrangement may present opportunities where at least some kinds of events, functions or operations can be coordinated among the connected BSs for a MS, for example.

Figure 2:
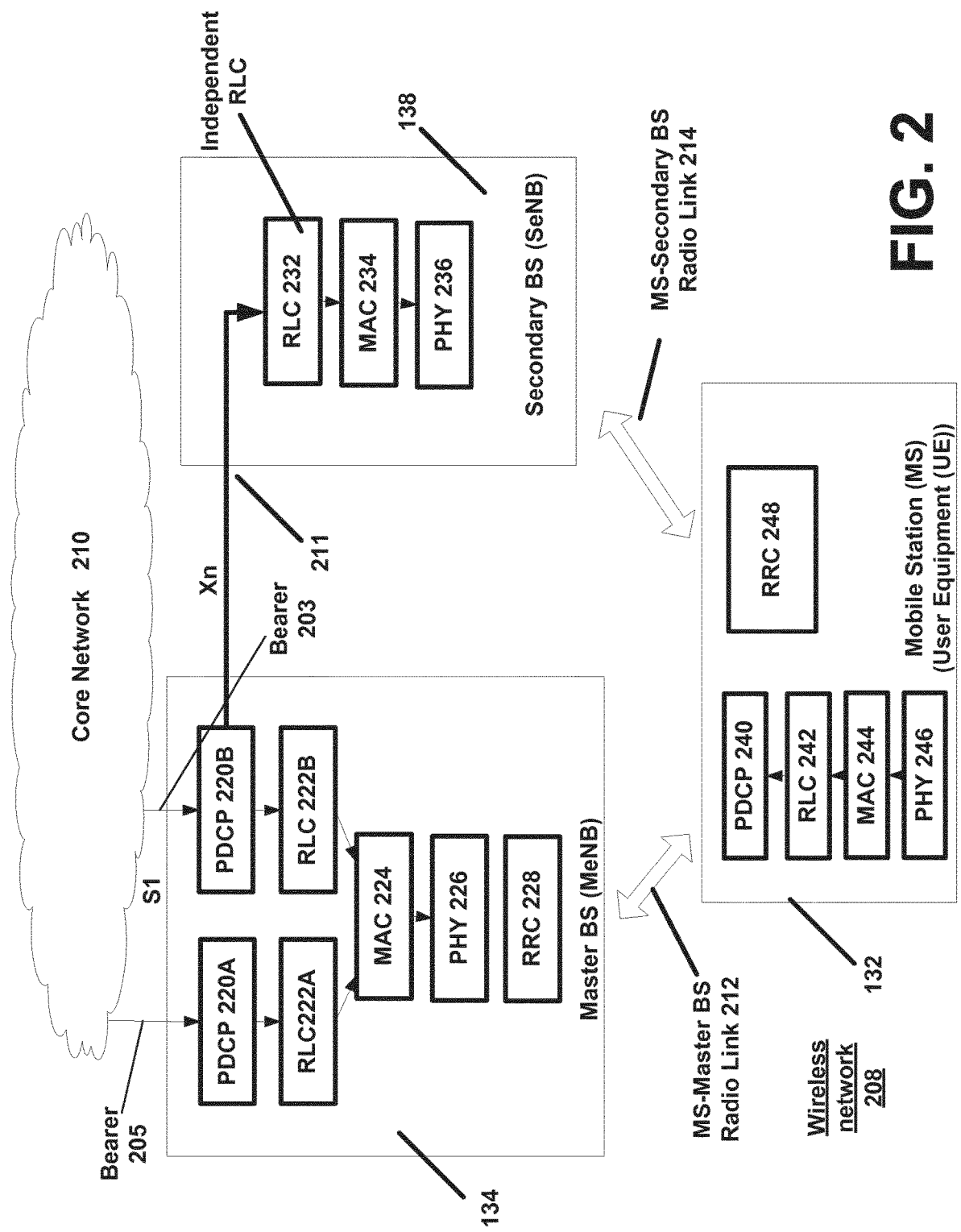
FIG. 2 is a block diagram illustrating a dual connectivity wireless network 208 in more detail according to an example implementation.

FIG. 2 is a block diagram illustrating a dual connectivity wireless network 208 in more detail according to an example implementation. Although not shown, each BS and the MS includes a processor, memory and multiple wireless transceivers (wireless transmitter/receiver). Master (or macro) BS 134 and secondary BS 138 may be connected via a bidirectional backhaul connection (which may be wired or wireless), which is shown in FIG. 2 as an Xn interface. One or both of BSs 134, 138 may be connected to the core network 210 via a bidirectional 51 interface. A MS 132 may be simultaneously connected to master BS 134 via a MS-master BS radio link 212 and to secondary BS 138 via a MS-secondary BS radio link 214.

MS 132, BS 134 and BS 138 each includes at least one radio protocol stack that may be implemented in hardware and/or software. According to an example implementation, a protocol stack may include logic, and/or computer instructions executed by a processor to perform the functions or operations for each entity of the protocol stack. An example protocol stack for the master BS 134 may include, for example, at least a Packet Data Convergence Protocol (PDCP) entity 220A, a Radio Link Control (RLC) entity 222A, a Media Access Control (MAC) entity 224, a Physical layer (PHY) entity 226, and a Radio Resource Control (RRC) entity 228.

The PDCP entity 220A performs ciphering (encryption and decryption of data) and header compression-decompression. There is one PDCP entity 222A per radio bearer configured for a MS. The RLC entity 222A performs segmentation/concatenation, error detection and correction, data retransmission, duplicate detection and in-sequence data delivery to higher layers. According to an example implementation, there may be one RLC entity per radio bearer or multiple RLC entities per radio bearer configured for a MS, and one RLC entity corresponding to one logical channel. According to one example implementation, the radio protocol stack may include two RLC entities per radio bearer. MAC entity 224 performs multiplexing of logical channels (where there may be one or more logical channel per radio bearer), hybrid ARQ retransmissions, inserting of MAC control elements (MAC CEs) used for in-band control signaling, and other MAC-related functions. The BS MAC entity 224 also performs uplink and downlink scheduling (located in MAC entity of each BS). The MAC entity 224 provides services to the RLC entities in the form of logical channels. The PHY entity 226 handles or performs coding/decoding, modulation/demodulation, multi-antenna mapping, and other physical layer functions. Multiple RLC entities within a BS may share one MAC entity 224 and one PHY entity 226.

RRC entity 228 is responsible for handling a number of functions or procedures related to the Radio Access Network (RAN) (e.g., shown in FIGS. 1-2), including broadcast of system information necessary for the MS to be able to communicate with a cell or BS, transmission of paging messages originating from the core network 210 to notify a MS about incoming connection requests, connection management including setting up bearers and mobility, mobility functions such as cell selection and reselection, and other control related functions.

According to an example implementation, the LTE (for example) Radio Access Network (RAN), which includes a group of BSs or eNBs, provides one or more radio bearers. A radio bearer generally provides a radio/wireless transport service between two points. For example, packets may be mapped to bearers according to their QoS (quality of service) requirements and the destination (IP address or MS) of the packets. In an example implementation, a bearer may be identified by a combination of a QoS class identifier (QCI) (identifying a QoS for the packets) and an IP address of a destination MS. A bearer may include packets of multiple services which require the same QoS (delay, priority, etc.) and directed to/from the same IP address/MS address. Some example QoSs may include a guaranteed bit rate (GBR) and a maximum bit rate (MBR). According to an example implementation, RRC messages may be sent via signaling radio bearers, while data signals and voice signals may be sent via data radio bearers. A radio bearer may be mapped to one or more logical channels.

Referring to FIG. 2, two bearers are shown, including a first bearer 203, and a second bearer 205. Within master BS 134, a PDCP/RLC protocol stack may be provided for each bearer and/or for each logical channel, wherein a plurality of PDCP and RLC entities may typically share a common MAC entity 224 and a common PHY entity 226. For example, a protocol stack that may include PDCP entity 220A, RLC entity 222A, MAC entity 224 and PHY entity 226 may be provided to handle or process data for a voice radio bearer (or for a first logical channel) to/from MS 132, while PDCP entity 220B, RLC entity 222B, MAC entity 224 and PHY entity 226 may be provided for a data radio bearer (or for a second logical channel) to/from MS 132.

Secondary BS 138 may include protocol entities that are the same or similar to those of master BS 134. For example, secondary BS 138 may include a RLC entity 232, a MAC entity 234, and a PHY entity 236. However, in one example implementation, in the scope of a given MS, secondary BS 138 does not include a PDCP entity, but rather, both master BS 134 and secondary BS 138 rely on a common (or shared) PDCP entity 220B to handle packets (perform PDCP functions) for bearer 203. Thus, in the scope of a given MS a common PDCP entity 220B may be provided or shared among master BS 134 and secondary BS 138 for bearer 203, while each of BS 134 and BS 138 includes separate RLC, MAC and PHY entities. For example, in the downlink direction (traffic or data received from core network 210), data or packets for the bearer 203 may be split into two paths, including a first path within master BS 134 (some of the received traffic passed to RLC entity 222B), and a second path for at least some of the data/traffic for bearer 203 to be directed to RLC entity 232 of secondary BS 138 via Xn interface, for example. In the uplink direction for bearer 203, traffic from the RLC 232/MAC 234 entities of secondary BS 138 and traffic from the RLC 222B/MAC 224 entities of the master BS 134 are both fed or input to common PDCP entity 220B for transmission over core network 210, for example.

MS 132 includes protocol entities that communicate with the peer entities at the master BS 134 and/or secondary BS 138. While only one protocol stack (PDCP, RLC, MAC and PHY) is shown for the MS 132, it should be understood that MS 132 may include at least one protocol stack for communicating with master BS 134 and at least one protocol stack for communicating with secondary BS 138, according to an example implementation. According to an example implementation, MS 132 may include for each protocol stack the following protocol entities: PDCP entity 240, RLC entity 242, MAC entity 244, PHY entity 246 and RRC entity 248. These protocol entities at MS 132 may, for example, perform the same or very similar functions as performed by the peer protocol entities of the master BS 134, and/or communicate with the peer entities at one or more BSs.

However, as shown in FIG. 2, in the case of bearer 203 that is split at master BS into two data paths, there is only one PDCP entity 220B for bearer 203 at master BS 134, and no PDCP entity at the secondary BS. That is, with respect to split bearer 203, the single PDCP entity 220B at master BS 134 is provided for handling data to/from both master BS 134 and secondary BS 138. Similarly, there is only one PDCP entity at MS 132 to handle data for split bearer 203 from both master BS (via radio link 212) and secondary BS (via radio link 214). MS 132 may include two different RLC entities for bearer 203 since the RLC entities 222B and 232 are independent. Therefore, for example, MS 132 may include one PDCP entity 240 (which would be a peer entity for PDCP entity 220B for bearer 203) and two RLC entities (not shown), including one RLC entity operating as a peer entity for each of RLC entities 222B and 232, for split bearer 203. The two RLC entities at MS 132 for bearer 203 may share a common MAC entity 244 and a common PHY entity 246.

A radio link 212 may be established between MS 132 and master BS 134, and this radio link may include or may handle one or more bearers, such as bearers 203 and 205. Each bearer may be mapped to (or may include) one or more logical channels. Similarly, a radio link 214 may be established between MS 132 and secondary BS 138. The radio link 214 may include one or more bearers, such as bearer 203, and the bearer may include one or more logical channels.

According to an example implementation, carrier aggregation is used in the wireless network 208 in FIG. 2. In one example implementation, the radio link 212 (and any associated radio bearers) between master BS 134 and MS 132 may be served by a primary component carrier (PCC). And, the radio link 214 (and any associated radio bearers) between secondary BS 138 and MS 132 may be served by a secondary component carrier (SCC). The radio resource control (RRC) connection (e.g., connection between RRC entity 228 of master BS 134 and RRC entity 248 of MS 132) can be served only by the primary cell (e.g., primary cell 136) and master BS 138, served by the PCC. Also, in at least some cases of multicarrier, the MS may perform the initial connection establishment procedure or initiates the connection re-establishment procedure with the master BS 134/primary cell 136 via the PCC. As part of carrier aggregation, after a RRC connection has been established between the MS 132 and master BS 134, the master BS 134 may configure the secondary BS 138/secondary cell 140 to provide additional radio resources via the SCC.

According to an example implementation, RLC entity 222B (in master BS 134) and RLC entity 232 (in secondary BS 138) may operate as independent RLC entities. In this example implementation, data for bearer 203 may be split by master BS 134, with some data for bearer 203 being transmitted by master BS 134 over radio link 212 and some data of the radio bearer 203 being transmitted by secondary BS 138 over radio link 214. For example, as shown in FIG. 2, PDCP entity 220B may provide PDCP PDUs to each RLC entity (222B and 232). Each independent RLC entity (222B and 232) may then, for example, generate RLC protocol data units (PDUs) and assign a PDU sequence number, before forwarding the RLC PDU(s) to its respective MAC entity for transmission to MS 132. For example, RLC 222B may receive some data from PDCP entity 220B and generate some RLC PDUs, with sequence numbers assigned to RLC PDUs by RLC entity 222B. Similarly, RLC entity 232 may also receive some other data (or other PDCP PDUs) from PDCP entity 220B, generate RLC PDUs and assign a sequence number to each PDU. In one example implementation, in the case of independent RLC entities for example, each RLC entity (232, 222B) may independently receive ACKs (acknowledgements) and NAKs (negative acknowledgements) from MS 132 for PDUs transmitted from the respective RLC entity, and handle any retransmissions as necessary.

Although FIG. 2 illustrates an example network implementation in which one PDCP entity is provided at the master BS 134 and the MS 132 for the bearer 203, other configurations are possible. For example, for the split bearer 203, the data split for bearer 203 may be performed higher in the protocol stack (above PDCP) such that data of the bearer is split and provided to both a PDCP entity at the master BS 134 and a PDCP entity at the secondary BS 138. In this example implementation, there may be two PDCP entities at the MS 132 as peer entities to the PDCP entities at the master BS 134 and the secondary BS 138. This is another example implementation, and other implementations may be used.

Figure 3:
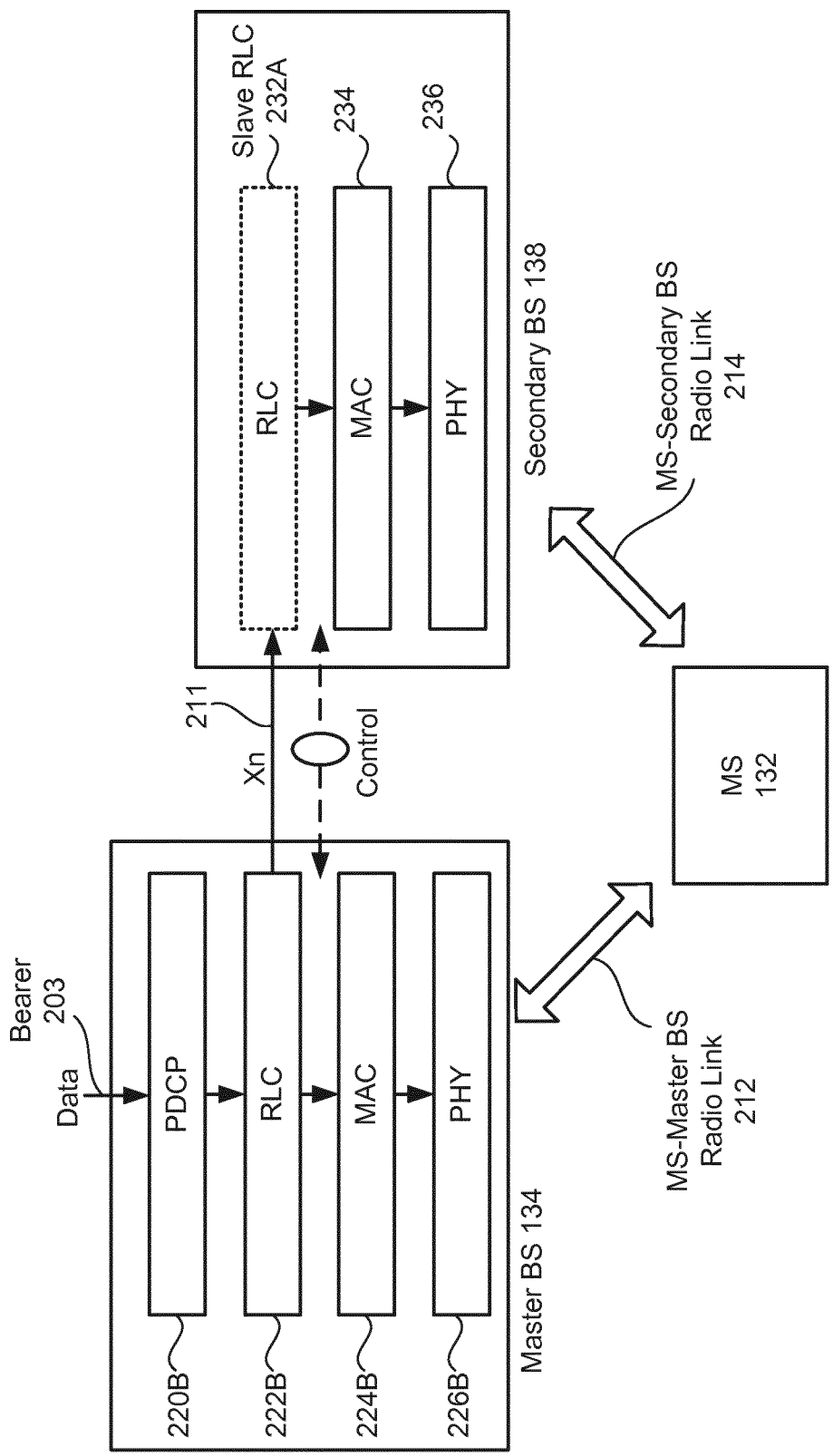
FIG. 3 is a block diagram illustrating a dual connectivity wireless network 208 in which RLC entities are provided as master RLC/slave RLC entities.

FIG. 3 is a block diagram illustrating a dual connectivity wireless network 208 in which RLC entities are provided as master RLC/slave RLC entities. In the example implementation shown in FIG. 3, RLC 222B is a master RLC entity while RLC entity 232A is a slave RLC entity. Also, the data for the bearer 203 is split in the master BS 134, e.g., by the master RLC entity 222B. In this example implementation, RLC entity 222B generates RLC PDUs that include an assigned PDU sequence number. Some of these RLC PDUs are transmitted to the MS 132 via MAC 224 and PHY 226 of master BS 134. The other RLC PDUs, generated by the master RLC entity 222B, are received by slave RLC entity 232A and are forwarded or transmitted by secondary BS 138 via radio link 214 (and a SCC) to MS 132, for example. Uplink data and control signals (ACKs and NAKs) may be sent by the MS 132 via radio link 212 and PCC to master BS and/or via radio link 214 and SCC to secondary BS 138. For example, all uplink data and ACK/NAKs from MS 132 (e.g., for data received via both radio links 212 and 214) may be sent via radio link 212 and PCC to master BS 134. Or, uplink data may be sent from MS 132 via radio link 212/PCC, while ACKs/NAKs from MS 132 may be sent via radio link 212/PCC for PDUs received via radio link 212/PCC from master BS 134, while ACKs/NAKs may be sent from MS 132 via radio link 214/SCC for PDUs received via radio link 214/SCC from secondary BS 138. Note, that in the master/slave RLCs example implementation shown in FIG. 3, there may be only one PDCP entity (as a peer entity to the PDCP entity 220B) at MS 132, and only one RLC entity at MS 132, for the split bearer 203. For example, MS 132 may include only one RLC entity (not shown) since there is only one independent RLC entity 222B within master BS 134, whereas the other RLC entity 232A is a slave RLC entity, for split bearer 203. These are merely some example configurations and operations for the master/slave RLC entities, and others may be used.

During operation of a wireless network that provides carrier aggregation via a master BS 134 and a secondary BS 138, the secondary BS 138 will typically store (or buffer) one or more PDUs, or portions thereof, prior to transmitting these PDUs to the MS 132. At some point, for various reasons, the secondary BS 138 may cease operating on the radio link (or radio bearer) 214 between the secondary BS 138 and the MS 132. When the secondary BS 138 ceases operating on the radio link 214 (or radio bearer), there may be one or more PDUs, or portions thereof, that have been stored or buffered in the secondary BS 138 but not yet transmitted to the MS, or buffered at the BS 138 and transmitted to MS 132 but not yet ACKed (acknowledged) by the MS 132 as being received. According to an example implementation, after ceasing to operate on the radio link (or radio bearer) 214, the secondary BS 138 may report the status of these PDUs (or portions thereof) to the master BS 134. In response to receiving the status of these PDUs or portions thereof, the master BS 134 may then transmit/retransmit (or cause another secondary BS to transmit/retransmit) these PDUs or portions thereof to the MS 132.

In one example implementation, in response to the secondary BS 138 detecting a trigger condition, the secondary BS 138 may report or provide the status of these PDUs or portions thereof by the secondary BS 138 sending to the master BS 134 a PDU status report that identifies one or more PDUs or portions thereof for further transmission. The trigger condition may be one of many different trigger conditions that may be detected by the secondary BS 138. Some example trigger conditions are described below as reasons identified by a reason (or cause) code.

FIGS. 2 and 3 illustrate example networks in which multicarrier operation is provided based on a primary component carrier (PCC) via radio link 212 and a secondary component carrier (SCC) via radio link 214. However, an alternative arrangement may be provided in which master BS 134 is not in direct communication with MS 132 via radio link 212 (e.g., radio link 212 does not exist between MS 132 and master BS 134). Rather, in this arrangement, master BS 134 forwards data to (and receives data from) secondary BS 138 for transmission via radio link 214. Secondary BS 138 may also send its own data to MS 132 via radio link 214. In this arrangement, MS 132 is in direct communication only with secondary BS 138 via radio link 214, and only a single carrier is used, for example. In this example arrangement, the same or similar trigger conditions may arise or may be detected by the secondary BS 138, and the secondary BS 138 may, in response to the trigger condition, cease operating on the carrier and radio link 214 and send a PDU status report to master BS 134 in the same or similar fashion as described herein for the multicarrier arrangements shown in FIGS. 2 and 3, for example.

According to an example implementation, the PDUs or portions thereof identified in the PDU status report may be required for further transmission if the secondary BS 138 actually was handling the receipt of ACKs/NAKs and retransmissions. In such a case, the secondary BS actually knows which PDUs (or portions thereof) have been transmitted and acknowledged, and which have not. On the other hand, there may be some uncertainty at the secondary BS as to which PDUs and portions thereof have actually been ACKed or NAKed back to the master BS 134, if the MS 132 is sending all or at least some of the ACKs/NAKs back to the master BS 134 (for data transmitted via radio link 214). In such a case, the PDU status report provided by the secondary BS 138 may be a suggested list for transmission/retransmission to the MS 132, since some of the PDUs or portions thereof may have been ACKed or NAKed only to the master BS 134.

The portions thereof may include portions of a PDU, or specific bytes of a PDU, since a PDU may be segmented and then transmitted as PDU segments. In one example implementation, the PDU status report may identify one or more sequence numbers of PDUs at least partially not transmitted by the secondary BS 138 to the MS 132. The PDU status report may identify one or more sequence numbers of PDUs at least partially not acknowledged by the MS. The PDU status report may also identify one or more sequence numbers of PDUs that were at least partially negatively acknowledged (NACKed) by the MS. The PDU status report may identify portions of a PDU, e.g., by byte number, that were negatively acknowledged by the MS 132.

As noted above, the secondary BS may detect a trigger condition. The secondary BS 138 may then send the PDU status report to the master BS 134 in response to detecting one of these trigger conditions. The PDU status report may also include a reason (or cause) code that identifies, for example, a reason (or cause) that the secondary BS 138 has ceased operating on the radio link 214 (or radio bearer), or a reason (or cause) that the BS 138 is sending the PDU status report to the master BS 134. Therefore, in one example implementation, the reason code may identify the trigger condition. For example, the reason (or cause) code may identify one (or more) of the following example reasons or trigger conditions: 1) the PDU status report was requested by master BS; 2) a traffic overload condition was detected at the secondary BS; 3) the secondary BS detected that an amount of traffic over a radio link (or radio bearer) between the MS and the secondary BS is less than a threshold; 4) a radio link failure of a radio link or radio bearer between MS and secondary BS that is detected by the secondary BS; 5) a message received from the master BS requesting/instructing that the secondary BS cease operating on one or more radio links (or radio bearers) between the secondary BS and the MS, e.g., a message requesting that the secondary BS deactivate or deconfigure a radio link (or radio bearer) between the secondary BS and the MS, e.g., based on the MS moving via handover to a new secondary BS. Each of these reasons/causes will be briefly described.

With respect to reason 1) (the PDU status report was requested by master BS), the master BS 134 may request a PDU status report from the secondary BS 138 for a variety of different reasons or purposes.

With respect to reason 2) (traffic overload condition), the secondary BS 138 may be operating as a single BS for multiple MSs, and may also be operating as a secondary BS for radio link 214 to provide carrier aggregation. However, in some cases, a traffic overload condition may occur at the secondary BS 138 in which the amount of traffic that is being handled by the secondary BS is greater than a threshold, or where the amount or number of packets/PDUs that have been sent and/or received by the secondary BS 138 within a period of time is greater than a threshold, or the secondary BS is otherwise overloaded, may be viewed as an overload condition. In the case of an overload condition, the secondary BS may, for example, send a PDU status report to master BS 134 with a reason code indicating overload condition to inform the master BS 134 that the secondary BS is overloaded and is no longer able to effectively operate as a secondary BS, for example. The secondary BS may then cease operating on the (secondary) radio link 214 or radio bearer between the secondary BS and the MS, either automatically or in response to an instruction or message from the master BS 134 to cease operating on the radio link 214. As described in greater detail below, examples of instructions or messages requesting the secondary BS 138 to cease operating on the radio link 214/radio bearer may include an instruction to deactivate or deconfigure the radio link or radio bearer between the secondary BS 138 and the MS 132.

With respect to reason 3) (amount of traffic over a radio link/radio bearer between the MS and the secondary BS is less than a threshold), the PDU status report may be sent by the secondary BS 138 to the master BS 134 if the amount of traffic between the secondary BS 138 and the MS 132 is less than a threshold, thereby indicating a lack of use of this additional radio link/radio bearer. The master BS 134 may then, for example, instruct the secondary BS 138 to cease operating on the radio link 214 between the secondary BS 138 and the MS 132, e.g., as these resources (or radio link 214) are not being used very much, and the resources may be better used elsewhere or better applied to other MSs or other radio links.

With respect to reason 4) (a radio link failure of a radio link or radio bearer between MS and secondary BS that is detected by the secondary BS), many different techniques may be used by the secondary BS 138 to detect a failure of the radio link 214 (or radio bearer) between the MS 132 and secondary BS 138. For example, a timer at the secondary BS may expire or time out when an expected response or expected data is not received within the time-out value. Another example of a detected radio link failure involves the secondary BS 138 reaching a maximum number of retransmissions to the MS 132. An RLC entity that is associated with (e.g., handling or processing packets or PDUs for) a bearer or logical channel of a radio link handles error detection and correction, and performs retransmissions for that bearer or logical channel. For example, if an acknowledgement for a PDU (protocol data unit) is not received by the secondary BS before a timeout, the RLC entity of the BS may retransmit the PDU, and a retransmission counter is incremented. If the retransmission counter reaches a maximum (or threshold) value, and the PDU has not been acknowledged as being received by the MS, then the RLC entity of the secondary BS may declare a radio link failure (e.g., due to a maximum number of retransmissions being reached without an acknowledgement being received for the PDU), and the RLC entity of the BS may report the radio link failure to one or more upper layers (e.g., to the RRC entity of the BS) of its protocol stack. While only two examples of detecting a radio link failure are described, other techniques may be used for the secondary BS 138 to detect a radio link failure of radio link 214.

Reason 5) involves a message received from the master BS 134 requesting that the secondary BS 138 cease operating on one or more radio links (or radio bearers) between the secondary BS 138 and the MS 132. A master BS may request that the secondary BS 138 cease operating on the radio link 214 for different reasons, such as, for example, the MS 132 has moved via handover to a new secondary BS, and the old radio link 214 should therefore be terminated. Therefore, the secondary BS 138 may receive from the master BS 134 a message requesting (or a request) that the secondary BS 138 cease operating on one or more radio links or radio bearers between the secondary BS 138 and the MS 132. The message requesting that the secondary BS cease operating on one or more radio links or radio bearers between the secondary BS 138 and the MS 132 may include a request to deactivate or deconfigure a radio link (or radio bearer) between the secondary BS and the MS.

As noted above, a primary cell may provide a primary component carrier, and a secondary cell may provide a secondary component carrier. Cells and their associated component carriers are associated with a radio link. For example, primary cell 136 is provided by master BS 134 and is associated with a primary component carrier and radio link 212 (FIGS. 1-2). Similarly, secondary cell 140 is provided by secondary BS 138 and is associated with a secondary component carrier and radio link 214.

In order for a MS to use a component carrier, a cell and its component carrier must be configured and then activated. One or more of the SCells may be activated and/or deactivated. For example, deconfiguration of a SCell and its secondary component carrier may be performed, for example, by the master BS 134 sending a connection reconfiguration request to the secondary BS 138 that identifies deconfiguration or release of the secondary cell (SCell), and results in the release of the SCell and its resources.

The primary cell (PCell) is typically always activated, according to an example implementation. SCells and their associated component carriers can be activated and deactivated by sending activation/deactivation messages. For example, an activation/deactivation request may be sent from the master BS 134 to the secondary BS 138 requesting the secondary BS 138 to deactivate the SCell 140 (FIG. 1) associated with the radio link 214 and secondary BS 138, by sending a MAC control element to the MS.

Therefore, according to an example implementation, as one of the example trigger conditions, the secondary BS 138 may receive from the master BS 134 a message requesting that the secondary BS cease operating on one or more radio links (or radio bearers) between the secondary BS and the MS. According to an example implementation, the received message may be, for example: a connection reconfiguration request that requests deconfiguration or release of a secondary cell associated with a secondary component carrier and the radio link between the secondary BS and the MS; or a message requesting a deactivation of a secondary cell (SCell) associated with the secondary component carrier and the radio link between the secondary BS and the MS. These are merely example messages or instructions. Other messages or instructions may be used to cause the secondary BS 138 to cease operating on the radio link or radio bearer, including other types of deconfiguration messages or deactivation messages.

Figure 4:
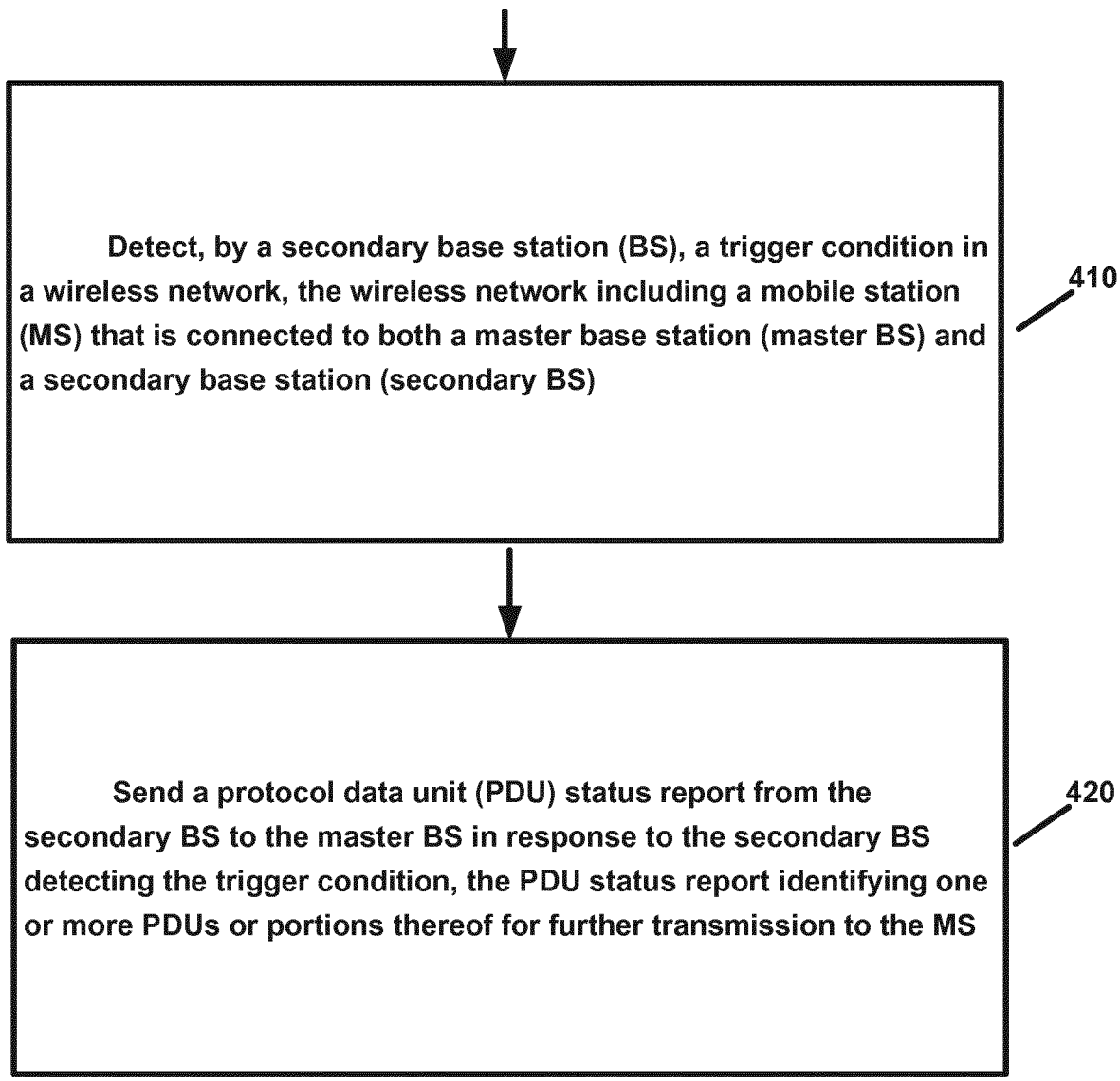
FIG. 4 is a flow chart illustrating operation of a secondary base station according to an example implementation.

FIG. 4 is a flow chart illustrating operation of a secondary base station according to an example implementation. The method or technique illustrated in FIG. 4 may include several operations. At operation 410, the secondary BS detects a trigger condition in a wireless network. The wireless network may include a mobile station (MS) that is connected to both a master base station (master BS) and a secondary base station (secondary BS). At operation 420, the secondary BS sends a protocol data unit (PDU) status report to the master BS in response to the secondary BS detecting the trigger condition, the PDU status report identifying one or more PDUs or portions thereof for further transmission to the MS.

In the method of FIG. 4, the wireless network may be provided in a multicarrier arrangement including a mobile station (MS) that is connected to and receives data from both a master base station (master BS) associated with a primary cell and a secondary base station (secondary BS) associated with a secondary cell.

In the method of FIG. 4, the master BS includes a protocol stack that includes at least a packet data convergence protocol (PDCP) entity and a first radio link control (RLC) entity, and wherein the secondary BS includes a protocol stack that includes at least a second RLC entity that is independent of the first RLC entity, wherein both the first and the second RLC entities each receive some PDCP PDUs from the PDCP entity of the master BS for transmission to the MS.

In the method of FIG. 4, the master BS includes a protocol stack that includes at least a packet data convergence protocol (PDCP) entity and a master radio link control (RLC) entity that receives PDCP PDUs from the PDCP entity, wherein the master RLC entity generates RLC PDUs, the master RLC entity transmitting some of the RLC PDUs to the MS, wherein the secondary BS includes a slave RLC entity that receives at least some of the RLC PDUs from the master RLC entity of the master BS for transmission to the MS, wherein the master RLC entity assigns a sequence number to each of the RLC PDU before being transmitted to the MS or sent to the slave RLC entity for forwarding to the MS.

In the method of FIG. 4, the PDU status report identifies one or more sequence numbers of PDUs at least partially not transmitted by the secondary BS to the MS. The PDU status report may further identify one or more sequence numbers of PDUs that were at least partially negatively acknowledged (NACKed) by the MS.

In the method of FIG. 4, the PDU status report identifies one or more sequence numbers of PDUs at least partially not acknowledged by the MS. The PDU status report further identifies one or more sequence numbers of PDUs that were at least partially negatively acknowledged (NACKed) by the MS.

In the method of FIG. 4, the PDU status report may include a reason code. In the method of FIG. 4, the PDU status report may include a reason code that identifies a reason why the PDU status report is being sent to the master BS, wherein the reason code identifies one of the following reasons: a radio link failure of a radio link or radio bearer between MS and secondary BS; PDU status report requested by master BS; a traffic overload condition at the secondary BS; detecting that an amount of traffic over a radio link (or radio bearer) between the MS and the secondary BS is less than a threshold; a message received from the master BS requesting that the secondary BS cease operating on a radio link (or radio bearer) between the secondary BS and the MS; a message received from the master BS requesting that the secondary BS deactivate or deconfigure a radio link (or radio bearer) between the secondary BS and the MS based on the MS moving via handover to a new secondary BS; a message received from another BS, that is not the master BS, requesting that the secondary BS cease operating on a radio link (or radio bearer) between the secondary BS and the MS; a message received from the MS requesting that the secondary BS cease operating on a radio link (or radio bearer) between the secondary BS and the MS; a message received from the master BS indicating that a radio link (or radio bearer) between the secondary BS and the MS has been deactivated or deconfigured; and a message received from another BS, that is not the master BS, indicating that a radio link (or radio bearer) between the secondary BS and the MS has been deactivated or deconfigured based on the MS moving via handover to a new secondary BS. For example, the radio link failure may include at least one of the following: the secondary BS reaching a maximum number of retransmissions to the MS; and an expiration of a timer for transmission detected by the secondary BS.

In the method of FIG. 4, the detecting the trigger condition may include the secondary BS detecting a failure of a radio link (or radio bearer) between the secondary BS and the MS.

In the method of FIG. 4, the detecting the trigger condition may include receiving by the secondary BS from the master BS a message requesting that the secondary BS cease operating on one or more radio links (or radio bearers) between the secondary BS and the MS. For example, the message may include at least one of: a connection reconfiguration request that indicates deconfiguration or release of a secondary cell associated with a secondary component carrier and the radio link between the secondary BS and the MS; and a request to deactivate a secondary cell (SCell) associated with the secondary component carrier and the radio link between the secondary BS and the MS.

In the method of FIG. 4, the detecting the trigger condition may include receiving by the secondary BS a message indicating that a radio link (or radio bearer) between the secondary BS and the MS has been deactivated or deconfigured.

In the method of FIG. 4, the detecting the trigger condition may include receiving by the secondary BS a message indicating that a radio link (or radio bearer) between the secondary BS and the MS has been deactivated or deconfigured based on the MS moving via handover to a new secondary BS.

In the method of FIG. 4, the detecting the trigger condition may include receiving by the secondary BS a message received from another BS, that is not the master BS, requesting that the secondary BS cease operating on a radio link (or radio bearer) between the secondary BS and the MS.

In the method of FIG. 4, the detecting the trigger condition may include receiving by the secondary BS a message received from the MS requesting that the secondary BS cease operating on a radio link (or radio bearer) between the secondary BS and the MS.

In the method of FIG. 4, the detecting the trigger condition may include receiving by the secondary BS from the master BS a message requesting that the secondary BS deactivate or deconfigure a radio link (or radio bearer) between the secondary BS and the MS. For example, the message requesting the secondary BS deactivate the radio link may include a request to deactivate a secondary cell (SCell) associated with the secondary component carrier and the radio link between the secondary BS and the MS; and wherein the message requesting the secondary BS deconfigure the radio link may include a connection reconfiguration request that indicates deconfiguration or release of a secondary cell associated with the secondary component carrier and the radio link between the secondary BS and the MS.

In the method of FIG. 4, the detecting the trigger condition may include detecting an overload condition where secondary BS has become overloaded with sending or receiving packets.

In the method of FIG. 4, the detecting the trigger condition may include detecting that an amount of traffic over a radio link between the MS and the secondary BS is less than a threshold.

In the method of FIG. 4, the detecting the trigger condition may include receiving by the secondary BS a message requesting that the secondary BS deactivate or deconfigure a radio link (or radio bearer) between the secondary BS and the MS based on the MS moving via handover to a new secondary BS.

In the method of FIG. 4, the detecting the trigger condition may include receiving by the secondary BS from the master BS a message requesting that the secondary BS deactivate or deconfigure a radio link (or radio bearer) between the secondary BS and the MS based on no further data to be transmitted to the MS.

In the method of FIG. 4, the PDU status report identifying one or more PDUs or portions thereof for further transmission to the MS causes the master BS to transmit or cause another secondary BS to transmit at least some of the PDUs or portions thereof identified for further transmission to the MS.

According to another example implementation, an apparatus may include at least one processor and at least one memory including computer instructions, when executed by the at least one processor, cause the apparatus to: detect, by a secondary base station (BS), a trigger condition in a wireless network, the wireless network including a mobile station (MS) that is connected to both a master base station (master BS) and a secondary base station (secondary BS); and send a protocol data unit (PDU) status report from the secondary BS to the master BS in response to the secondary BS detecting the trigger condition, the PDU status report identifying one or more PDUs or portions thereof for further transmission to the MS.

The apparatus wherein the instructions causing the apparatus to detect the trigger condition may include instructions causing the apparatus to receive by the secondary BS from the master BS a message requesting that the secondary BS cease operating on one or more radio links (or radio bearers) between the secondary BS and the MS. The message may include at least one of: a connection reconfiguration request that indicates deconfiguration or release of a secondary cell associated with a secondary component carrier and the radio link between the secondary BS and the MS; and a request to deactivate a secondary cell (SCell) associated with the secondary component carrier and the radio link between the secondary BS and the MS.

In the apparatus, the instructions causing the apparatus to detect the trigger condition may include instructions causing the apparatus to receive by the secondary BS a message indicating that a radio link (or radio bearer) between the secondary BS and the MS has been deactivated or deconfigured.

In the apparatus, the instructions causing the apparatus to detect the trigger condition may include instructions causing the apparatus to receive by the secondary BS a message received from another BS, that is not the master BS, requesting that the secondary BS cease operating on a radio link (or radio bearer) between the secondary BS and the MS.

In another example implementation, the master BS includes a protocol stack that includes at least a packet data convergence protocol (PDCP) entity and a master radio link control (RLC) entity that receives PDCP PDUs from the PDCP entity, wherein the master RLC entity generates RLC PDUs, the master RLC entity transmitting some of the RLC PDUs to the MS, wherein the secondary BS includes a slave RLC entity that receives at least some of the RLC PDUs from the master RLC entity of the master BS for transmission to the MS, wherein the master RLC entity assigns a sequence number to each of the RLC PDU before being transmitted to the MS or sent to the slave RLC entity for forwarding to the MS.

In an example implementation, the PDU status report may include: one or more sequence numbers of PDUs at least partially not transmitted by the secondary BS to the MS; one or more sequence numbers of PDUs that were at least partially negatively acknowledged (NACKed) by the MS; and a reason code.

In an example implementation, the PDU status report may include a reason code that identifies a reason why the PDU status report is being sent to the master BS, wherein the reason code identifies at least one of the following reasons: a radio link failure of a radio link or radio bearer between MS and secondary BS; PDU status report requested by master BS; a traffic overload condition at the secondary BS; a message received from the master BS requesting that the secondary BS deactivate or deconfigure a radio link (or radio bearer) between the secondary BS and the MS; detecting that an amount of traffic over a radio link (or radio bearer) between the MS and the secondary BS is less than a threshold; a message received from the master BS requesting that the secondary BS deactivate or deconfigure a radio link (or radio bearer) between the secondary BS and the MS based on the MS moving via handover to a new secondary BS; a message received from another BS, that is not the master BS, requesting that the secondary BS cease operating on a radio link (or radio bearer) between the secondary BS and the MS; a message received from the MS requesting that the secondary BS cease operating on a radio link (or radio bearer) between the secondary BS and the MS; a message received from the master BS indicating that a radio link (or radio bearer) between the secondary BS and the MS has been deactivated or deconfigured; and a message received from another BS, that is not the master BS, indicating that a radio link (or radio bearer) between the secondary BS and the MS has been deactivated or deconfigured based on the MS moving via handover to a new secondary BS.

According to yet another example implementation, a computer program product is provided that includes a non-transitory computer-readable storage medium and storing executable code that, when executed by at least one data processing apparatus, is configured to cause the at least one data processing apparatus to perform a method including: detecting, by a secondary base station (BS), a trigger condition in a wireless network, the wireless network including a mobile station (MS) that is connected to both a master base station (master BS) and a secondary base station (secondary BS); and sending a protocol data unit (PDU) status report from the secondary BS to the master BS in response to the secondary BS detecting the trigger condition, the PDU status report identifying one or more PDUs or portions thereof for further transmission to the MS.

The computer program product wherein the data processing apparatus detecting the trigger condition includes the data processing apparatus receiving by the secondary BS from the master BS a message requesting that the secondary BS cease operating on one or more radio links (or radio bearers) between the secondary BS and the MS.

The computer program product wherein the data processing apparatus detecting the trigger condition includes the data processing apparatus receiving by the secondary BS a message indicating that a radio link (or radio bearer) between the secondary BS and the MS has been deactivated or deconfigured.

The computer program product wherein the data processing apparatus detecting the trigger condition includes the data processing apparatus receiving by the secondary BS a message received from another BS, that is not the master BS, requesting that the secondary BS cease operating on a radio link (or radio bearer) between the secondary BS and the MS.

The computer program product wherein the message may include at least one of: a connection reconfiguration request that indicates deconfiguration or release of a secondary cell associated with a secondary component carrier and the radio link between the secondary BS and the MS; and a request to deactivate a secondary cell (SCell) associated with the secondary component carrier and the radio link between the secondary BS and the MS.

Figure 5:
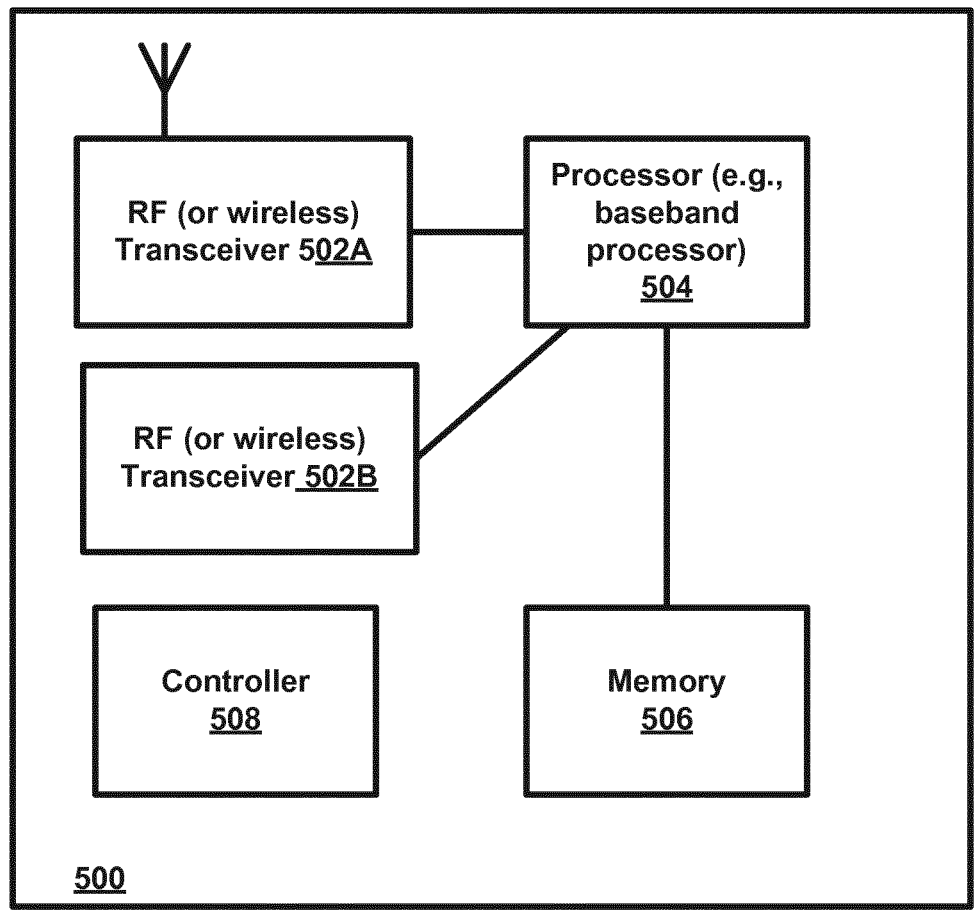
FIG. 5 is a block diagram of a wireless station (e.g., BS or MS) 500 according to an example implementation.

FIG. 5 is a block diagram of a wireless station (e.g., BS or MS) 500 according to an example implementation. The wireless station 500 may include, for example, two RF (radio frequency) or wireless transceivers 502A, 502B, where each wireless transceiver includes a transmitter to transmit signals and a receiver to receive signals. The wireless station also includes a processor 504 to execute instructions or software and control transmission and receptions of signals, and a memory 506 to store data and/or instructions.

Processor 504 may also make decisions or determinations, generate frames, packets or messages for transmission, decode received frames or messages for further processing, and other tasks or functions described herein. Processor 504, which may be a baseband processor, for example, may generate messages, packets, frames or other signals for transmission via wireless transceiver 502. Processor 504 may control transmission of signals or messages over a wireless network, and may receive signals or messages, etc., via a wireless network (e.g., after being downconverted by wireless transceiver 502, for example). Processor 504 may be programmable and capable of executing software or other instructions stored in memory or on other computer media to perform the various tasks and functions described above, such as one or more of the tasks or methods described above. Processor 504 may be (or may include), for example, hardware, programmable logic, a programmable processor that executes software or firmware, and/or any combination of these. Using other terminology, processor 504 and transceiver 502 together may be considered as a wireless transmitter/receiver system, for example.

In addition, referring to FIG. 5, a controller (or processor) 508 may execute software and instructions, and may provide overall control for the station 500, and may provide control for other systems not shown in FIG. 5, such as controlling input/output devices (e.g., display, keypad), and/or may execute software for one or more applications that may be provided on wireless station 500, such as, for example, an email program, audio/video applications, a word processor, a Voice over IP application, or other application or software.

In addition, a storage medium may be provided that includes stored instructions, which when executed by a controller or processor may result in the processor 504, or other controller or processor, performing one or more of the functions or tasks described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   detecting, by a secondary base station (BS), a trigger condition in a wireless network, the wireless network including a mobile station (MS) that is simultaneously connected to both a master base station (master BS) and the secondary base station (secondary BS); and
   sending a protocol data unit (PDU) status report from the secondary BS to the master BS in response to the secondary BS detecting the trigger condition, the PDU status report identifying previously assigned sequence numbers of one or more PDUs or portions thereof that are for further transmission to the MS, wherein the PDU status report comprises a reason code, the reason code identifying a reason the PDU status report is being sent to the master BS, and the reason code identifying the trigger condition out of a plurality of trigger conditions.

2. The method of claim 1, wherein the reason code identifies one or more of the following reasons:
   a radio link failure of a radio link or radio bearer between MS and secondary BS;
   PDU status report requested by master BS;
   a traffic overload condition at the secondary BS; and
   detecting that an amount of traffic over a radio link or radio bearer between the MS and the secondary BS is less than a threshold.

3. The method of claim 1 wherein the detecting the trigger condition comprises the secondary BS detecting a failure of a radio link or radio bearer between the secondary BS and the MS.

4. The method of claim 1 wherein the detecting the trigger condition comprises receiving by the secondary BS from the master BS a message requesting that the secondary BS cease operating on one or more radio links or radio bearer between the secondary BS and the MS.

5. The method of claim 1 wherein the detecting the trigger condition comprises receiving by the secondary BS a message indicating that a radio link or radio bearer between the secondary BS and the MS has been deactivated or deconfigured.

6. The method of claim 1 wherein the detecting the trigger condition comprises receiving by the secondary BS a message indicating that a radio link or radio bearer between the secondary BS and the MS has been deactivated or deconfigured based on the MS moving via handover to a new secondary BS.

7. The method of claim 1 wherein the detecting the trigger condition comprises receiving by the secondary BS a message received from another BS, that is not the master BS, requesting that the secondary BS cease operating on a radio link or radio bearer between the secondary BS and the MS.

8. The method of claim 1 wherein the detecting the trigger condition comprises receiving by the secondary BS a message received from the MS requesting that the secondary BS cease operating on a radio link or radio bearer between the secondary BS and the MS.

9. The method of claim 1 wherein the detecting the trigger condition comprises receiving by the secondary BS from the master BS a message requesting that the secondary BS deactivate or deconfigure a radio link or radio bearer between the secondary BS and the MS.

10. The method of claim 1 wherein the detecting the trigger condition comprises detecting an overload condition where secondary BS has become overloaded with sending or receiving packets.

11. The method of claim 1 wherein the detecting the trigger condition comprises detecting that an amount of traffic over a radio link between the MS and the secondary BS is less than a threshold.

12. The method of claim 1 wherein the detecting the trigger condition comprises receiving by the secondary BS a message requesting that the secondary BS deactivate or deconfigure a radio link or radio bearer between the secondary BS and the MS based on the MS moving via handover to a new secondary BS.

13. The method of claim 1 wherein the detecting the trigger condition comprises receiving by the secondary BS from the master BS a message requesting that the secondary BS deactivate or deconfigure a radio link or radio bearer between the secondary BS and the MS based on no further data to be transmitted to the MS.

14. The method of claim 1 wherein the PDU status report identifying previously assigned sequence numbers of one or more PDUs or portions thereof that are for further transmission to the MS causes the master BS to transmit or cause another secondary BS to transmit at least some of the PDUs or portions thereof that are identified for further transmission to the MS.

15. An apparatus comprising at least one processor and at least one memory including computer instructions, when executed by the at least one processor, cause the apparatus to:
detect, by a secondary base station (BS), a trigger condition in a wireless network, the wireless network including a mobile station (MS) that is simultaneously connected to both a master base station (master BS) and the secondary base station (secondary BS); and
send a protocol data unit (PDU) status report from the secondary BS to the master BS in response to the secondary BS detecting the trigger condition, the PDU status report identifying previously assigned sequence numbers of one or more PDUs or portions thereof that are for further transmission to the MS, wherein the PDU status report comprises a reason code, the reason code identifying a reason the PDU status report is being sent to the master BS, and the reason code identifying the trigger condition out of a plurality of trigger conditions.

16. The apparatus of claim 15 wherein the instructions causing the apparatus to detect the trigger condition comprises instructions causing the apparatus to receive by the secondary BS from the master BS a message requesting that the secondary BS cease operating on one or more radio links or radio bearer between the secondary BS and the MS.

17. The apparatus of claim 15 wherein the instructions causing the apparatus to detect the trigger condition comprises instructions causing the apparatus to receive by the secondary BS a message indicating that a radio link or radio bearer between the secondary BS and the MS has been deactivated or deconfigured.

18. The apparatus of claim 15 wherein the instructions causing the apparatus to detect the trigger condition comprises instructions causing the apparatus to receive by the secondary BS a message received from another BS, that is not the master BS, requesting that the secondary BS cease operating on a radio link or radio bearer between the secondary BS and the MS.

19. The apparatus of claim 15 wherein the PDU status report comprises the reason code that identifies a reason the PDU status report is being sent to the master BS, wherein the reason code identifies at least one or more of the following reasons:
a radio link failure of a radio link or radio bearer between MS and secondary BS;
PDU status report requested by master BS;
a traffic overload condition at the secondary BS; and
detecting that an amount of traffic over a radio link or radio bearer between the MS and the secondary BS is less than a threshold.

20. A computer program product, the computer program product comprising a non-transitory computer-readable storage medium and storing executable code that, when executed by at least one data processing apparatus, is configured to cause the at least one data processing apparatus to perform a method comprising:
detecting, by a secondary base station (BS), a trigger condition in a wireless network, the wireless network including a mobile station (MS) that is simultaneously connected to both a master base station (master BS) and the secondary base station (secondary BS); and
sending a protocol data unit (PDU) status report from the secondary BS to the master BS in response to the secondary BS detecting the trigger condition, the PDU status report identifying previously assigned sequence numbers of one or more PDUs or portions thereof that are for further transmission to the MS, wherein the PDU status report comprises a reason code, the reason code identifying a reason the PDU status report is being sent to the master BS, and the reason code identifying the trigger condition out of a plurality of trigger conditions.

21. The computer program product of claim 20 wherein the data processing apparatus detecting the trigger condition comprises the data processing apparatus receiving by the secondary BS from the master BS a message requesting that the secondary BS cease operating on one or more radio links or radio bearer between the secondary BS and the MS.

22. The computer program product of claim 20 wherein the data processing apparatus detecting the trigger condition comprises the data processing apparatus receiving by the secondary BS a message indicating that a radio link or radio bearer between the secondary BS and the MS has been deactivated or deconfigured.

23. The computer program product of claim 20 wherein the data processing apparatus detecting the trigger condition comprises the data processing apparatus receiving by the secondary BS a message received from another BS, that is not the master BS, requesting that the secondary BS cease operating on a radio link or radio bearer between the secondary BS and the MS.

24. The computer program product of claim 20 wherein the data processing apparatus detecting the trigger condition comprises the data processing apparatus receiving by the secondary BS from the master BS at least one of:

a connection reconfiguration request that indicates deconfiguration or release of a secondary cell associated with a secondary component carrier and the radio link between the secondary BS and the MS; and a request to deactivate a secondary cell (SCell) associated with the secondary component carrier and the radio link between the secondary BS and the MS.

25. The method of claim 1 wherein the PDU status report identifies previously assigned sequence numbers of one or more PDUs that were at least partially not transmitted by the secondary BS to the MS.

26. The method of claim 1 wherein the PDU status report identifies previously assigned sequence numbers of one or more PDUs that were not at least partially acknowledged by the MS.

27. The method of claim 1 wherein the PDU status report identifies previously assigned sequence numbers of one or more PDUs that were at least partially negatively acknowledged (NACKed) by the MS.

* * * * *